(12) United States Patent
Myatt

(10) Patent No.: US 8,593,357 B2
(45) Date of Patent: Nov. 26, 2013

(54) TYRE HAVING A MEMBER WITH AN OFFSET ANTENNA

(75) Inventor: David Myatt, Cebazat (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 278 days.

(21) Appl. No.: 13/120,789

(22) PCT Filed: Sep. 21, 2009

(86) PCT No.: PCT/FR2009/051773
§ 371 (c)(1),
(2), (4) Date: Mar. 24, 2011

(87) PCT Pub. No.: WO2010/034925
PCT Pub. Date: Apr. 1, 2010

(65) Prior Publication Data
US 2011/0175778 A1    Jul. 21, 2011

(30) Foreign Application Priority Data

Sep. 25, 2008 (FR) ..................................... 08 56447

(51) Int. Cl.
*H01Q 1/32* (2006.01)
(52) U.S. Cl.
USPC ........................................................ 343/711
(58) Field of Classification Search
USPC ........ 343/711–717, 866; 340/426.24, 426.33, 340/442, 445, 447
See application file for complete search history.

(56) References Cited

U.S. PATENT DOCUMENTS

| | | | | | |
|---|---|---|---|---|---|
| 5,348,067 | A | * | 9/1994 | Myatt | 152/152.1 |
| 5,977,870 | A | * | 11/1999 | Rensel et al. | 340/447 |
| 6,147,659 | A | * | 11/2000 | Takahashi et al. | 343/866 |
| 6,546,982 | B1 | * | 4/2003 | Brown et al. | 152/152.1 |
| 7,009,576 | B2 | * | 3/2006 | Adamson et al. | 343/873 |
| 7,132,930 | B2 | * | 11/2006 | Wilson et al. | 340/426.33 |
| 7,492,328 | B2 | * | 2/2009 | Kish et al. | 343/897 |
| 7,604,029 | B2 | | 10/2009 | Myatt | 152/154.2 |
| 7,954,367 | B2 | * | 6/2011 | Mancosu et al. | 73/146 |
| 2002/0121132 | A1 | * | 9/2002 | Breed et al. | 73/146 |
| 2003/0217797 | A1 | | 11/2003 | Poulbot et al. | 152/152.1 |
| 2004/0159383 | A1 | * | 8/2004 | Adamson et al. | 152/152.1 |
| 2006/0290587 | A1 | | 12/2006 | Forster et al. | 343/806 |

FOREIGN PATENT DOCUMENTS

| | | |
|---|---|---|
| EP | 1 350 640 B1 | 10/2003 |
| WO | WO 99/29523 A1 | 6/1999 |
| WO | WO 03/105511 A1 | 12/2003 |
| WO | WO 2004/011285 A1 | 2/2004 |

* cited by examiner

*Primary Examiner* — Seung Lee
(74) *Attorney, Agent, or Firm* — Fitzpatrick, Cella, Harper & Scinto

(57) ABSTRACT

A motor-vehicle tire includes a sidewall and a member with an electronic device, a generally and substantially linear-shaped rectilinear wire antenna, and means of electrical connection between the wire antenna and the electronic device. The member is embedded in the sidewall in an arrangement such that the antenna is oriented circumferentially with respect to the tire and the connection means is oriented in a radial direction of the tire. The wire antenna is integrally offset radially on one side of the electronic device.

14 Claims, 3 Drawing Sheets

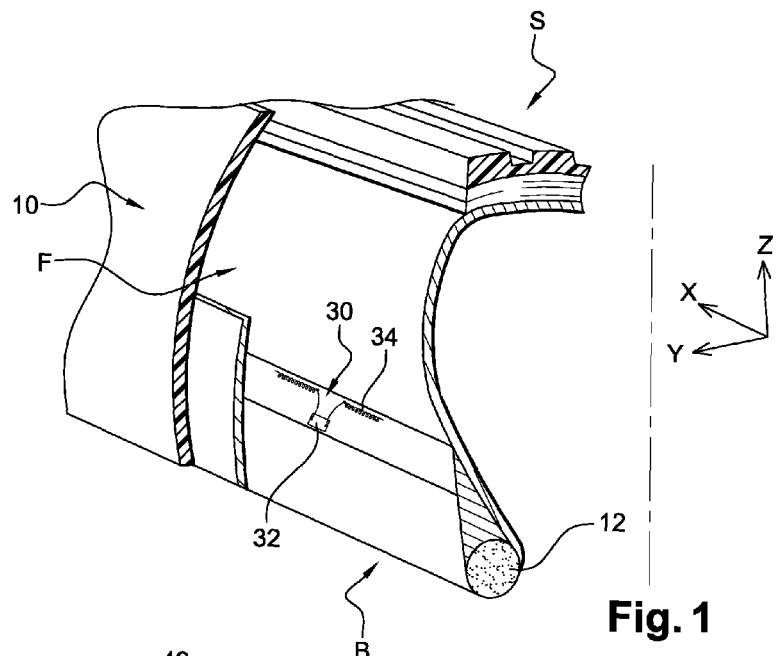
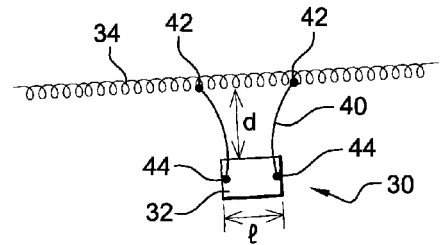
Fig. 2
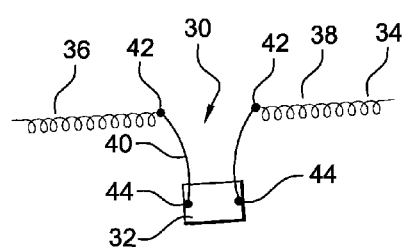
Fig. 3
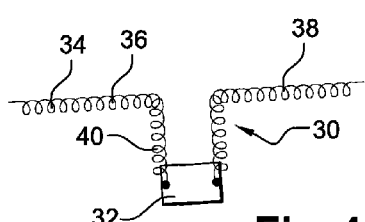
Fig. 4

TYRE HAVING A MEMBER WITH AN OFFSET ANTENNA

FIELD OF THE INVENTION

The invention relates to the field of motor-vehicle tyres, notably tyres incorporating an electronic member for controlling or measuring certain parameters.

BACKGROUND OF THE INVENTION

In the rest of the description, the general shape of the tyre is similar to a torus. Therefore, directions that are axial, radial, and circumferential to the tyre are defined relative to this torus.

Document WO 2004/011285 discloses a member comprising an electronic device such as an RFID (Radio Frequency Identification) chip to which a linear antenna is connected comprising two branches connected on either side of the chip.

The electric member disclosed in this document is supported by a sidewall of the tyre in a configuration such that the wire antenna is oriented in a circumferential direction of the tyre.

When the tyre is running on the ground, and notably when its tread is in the contact area, the sidewalls of the tyre deform, which generates circumferential stresses of extension-compression type. To withstand these various stresses, the wire antenna comprises undulations or spirals, which allow it to extend and to compress in the circumferential direction.

It is however noted that, despite the undulations or spirals of the wire antennas, the latter can break close to their connection with the electronic device or chip beyond a certain mileage. This mileage beyond which there are risks of premature breakage of the antenna is routinely reached by lorry tyres, the service life of which is much greater than that of a car tyre.

SUMMARY OF THE INVENTION

An aspect of the invention is to alleviate this drawback by providing a tyre furnished with a stronger electronic member.

Accordingly, an embodiment of the invention is a motor-vehicle tyre comprising a sidewall and a member comprising an electronic device, a generally and substantially linear-shaped rectilinear wire antenna, and means of electrical connection between the wire antenna and the electronic device. The member is embedded in the sidewall in an arrangement such that the antenna is oriented circumferentially with respect to the tyre and the connection means is oriented in a radial direction of the tyre. The wire antenna is integrally offset radially on one side of the electronic device.

In a tyre that is running, the radial deformations of the sidewall are usually very slight by virtue of the reinforcements of the carcass ply, reinforcements that are substantially non-stretchable. The passage of the tread in the contact area actually causes deformations that are mainly circumferential. However, the presence of the non-stretchable chip embedded inside the sidewall is the cause of disruption of the stress fields that are in the sidewall. The mechanical energy that is not dissipated in the rigid volume of the chip causes the appearance of more intense forces located at the interface between the rigid and flexible portions. The electronic member of the prior art comprises antenna branches extending circumferentially relative to the chip. These branches have undulations that are specially adapted to withstand the circumferential deformations of the rubber of the tyre. However, these antennas are not suitable for withstanding the additional stresses created by the presence of the electronic chip and its induced disrupting effects. Consequently, a fatigue of the antenna is frequently seen at its junction with the chip, this fatigue being able to cause a breakage of the connection after a high mileage.

By virtue of an embodiment of the invention, the antenna is integrally offset radially on one side of the device at a distance such that the zone of the sidewall in which the antenna is placed is not disrupted by the presence of the electronic chip. Consequently, the antenna is situated in a zone in which the forces are essentially circumferential and uniform. As has been seen above, it is possible to design antennas that withstand circumferential forces. The radial orientation of the means of electrical connection between the wire antenna and the electronic device allows them to better withstand the stresses sustained close to the electronic device because the field of stresses is principally circumferential.

Therefore, by virtue of the offsetting of the antenna relative to the chip, the stresses applied to the antenna are more uniform and the service life of the member is thereby lengthened.

Moreover, by virtue of moving the antenna away from the electronic device, it is possible, simultaneously to position the electronic device in a location of the sidewall that is favourable to its protection when running, for example in a location in which the deformations sustained by the sidewall are reduced, and to position the antenna in a location where the electromagnetic interference is reduced, for example in a location where the carcass ply of the tyre is relatively thin and comprises few particles of electrically conducting carbon. Consequently, whereas in the prior art it was necessary to find a compromise when positioning the member so that the device is protected and the antenna radiates correctly, this is no longer necessary because of an embodiment of the present invention.

A tyre according to an embodiment of the invention may also comprise one or more of the following features.

The antenna is helical.

The connection means comprises at least one helical conductor forming an inductance. By using as a connection means a conducting wire wound on itself, for example in the form of a coil, it is possible to form an inductance, the impedance of which can be predetermined.

The means of electrical connection are connected to the electronic device in a central zone of the device, relative to its circumferential extension. The disruptions of the stress field due to the presence of the rigid device in the tyre are higher at the ends of the device in a circumferential direction than at the centre of the device. Consequently it is advantageous to connect the means of electrical connection in a central zone of the device. If the device has a symmetrical shape relative to an axial plane, the means of electrical connection belong to this plane of symmetry.

The helical conductor is formed so that its impedance is equal to a predetermined value as a function of the antenna and of the device. It is usually preferable that the antenna used in the electric member is tuned relative to the transmission frequencies of the electronic device. However, when the electronic member is embedded in the tyre, the presence of rubber and of conductive particles in this rubber tends to cause interference in the transmission of the antenna and therefore to detune it. By virtue of the helical conductor according to an embodiment of the invention, it is possible to compensate for this interference in order to maintain a precise tuning of the antenna relative to these transmission frequencies.

The sidewall comprising a bead in a radially internal portion, the device is embedded in the side wall in the vicinity of the bead and the antenna is offset in a direction radially external to the tyre. The electronic device and its connections with the means of electrical connection to the antenna are relatively fragile. It is therefore recommended to position them in a zone of the sidewall where there are not many mechanical stresses. The radially internal zone of the sidewall, close to the bead, sustains few deformations because it is reinforced by the carcass ply and by the circumferential bead wire embedded in the bead. It is therefore advantageous to place the device in this zone. Conversely, because of the proximity of the bead wire and of the carcass ply, it is not recommended to position the antenna in this zone because these various metal elements disrupt the transmitted waves. Therefore, by virtue of an embodiment of the invention and of the radial offset of the antenna relative to the device, it is possible to position the device in the vicinity of the bead and to offset the antenna in a direction radially external to the tyre to the extent of positioning it in a location of the sidewall where electromagnetic conditions are more favourable, for example in a location of the sidewall in which the thickness of rubber is reduced.

The tyre comprising at least one annular bead wire of revolution about a reference axis and a carcass ply of generally toroidal shape coaxial with the bead wire, comprising a portion folded around the bead wire, the member is in a plane extending radially, travelling away from the reference axis, from a free edge of the folded portion of the carcass ply to a circumferential line of junction between the plane and the carcass ply. This location is particularly advantageous for positioning the electronic device because it sustains very few deformations because of the proximity to the carcass ply and its portion folded around the bead wire.

The device is at a distance of between 2 and 3 mm from the free edge of the folded portion.

The member is located at the interface between two masses of tyre rubber.

The sidewall includes a shoulder in the radially external portion, and the device is embedded in the sidewall in the vicinity of the shoulder and the antenna is offset in a direction that is radially internal to the tyre. The shoulder is located at the junction between the sidewall and the tread of the tyre. This is a zone of great thickness in which the deformations are slight. Consequently, positioning the chip close to the shoulder ensures that it will sustain few stresses, which increases its service life. Moreover, axially offsetting the antenna towards the radially internal portion of the sidewall makes it possible to place the antenna in a location of the sidewall that is relatively thin, that is to say in a location in which the rubber and carcass ply produce only slight electromagnetic interference.

The device is of the RFID type.

The radial offset of the antenna relative to the device is between 2 and 5 times the length of the device in the direction circumferential to the tyre. Measurements have shown that the zone of the sidewall disrupted by the presence of the device extends to a radial distance from the device that is substantially proportional to the circumferential length of the device.

The tyre comprising a carcass ply, the antenna is situated at least 2 mm from the carcass ply. Specifically, if the antenna is too close to the carcass ply, it sustains a great interference due to the presence of metal elements.

BRIEF DESCRIPTION OF THE DRAWINGS

The invention will be better understood upon reading the following description, given only as an example, with reference to the appended drawings, in which:

FIG. 1 is a partial view in perspective of a tyre according to an embodiment of the invention, the tyre including an electronic member embedded in its sidewall, FIGS. 2 to 6 are diagrams of several variants of the electronic member embedded in the sidewall of the tyre of FIG. 1.

DETAILED DESCRIPTION OF EMBODIMENTS OF THE INVENTION

In the figures are shown axes X, Y, and Z that are orthogonal with one another in the usual orientations, radial (Z), axial (Y), and circumferential (X) of a tyre.

Figure 7:
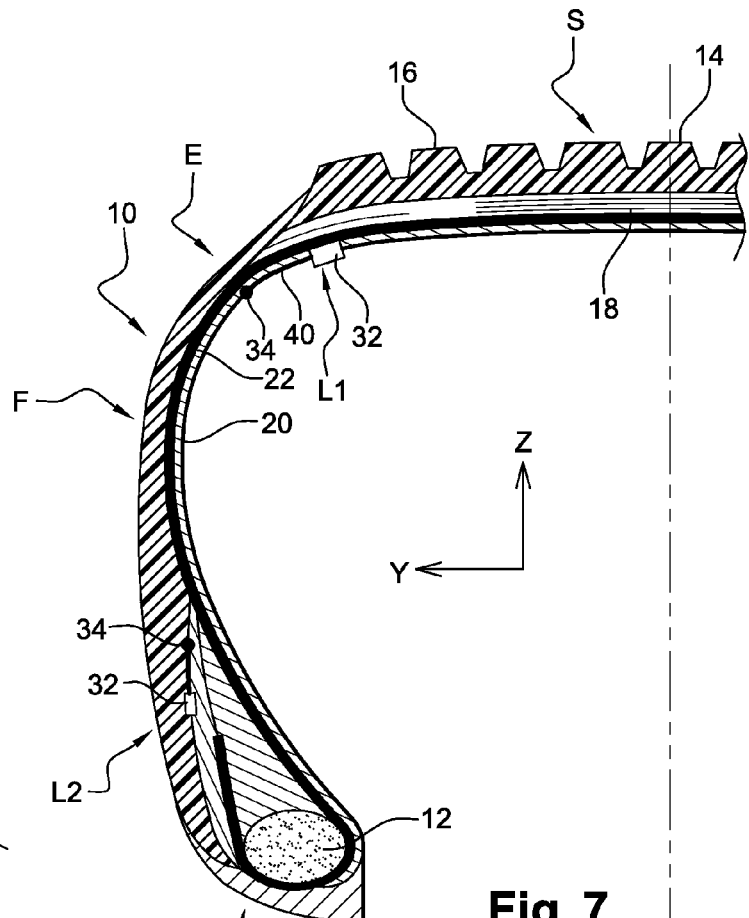
FIG. 7 is a diagram along an axial section of the tyre of FIG. 1, illustrating two possible positionings of the electronic member.
Figure 8:
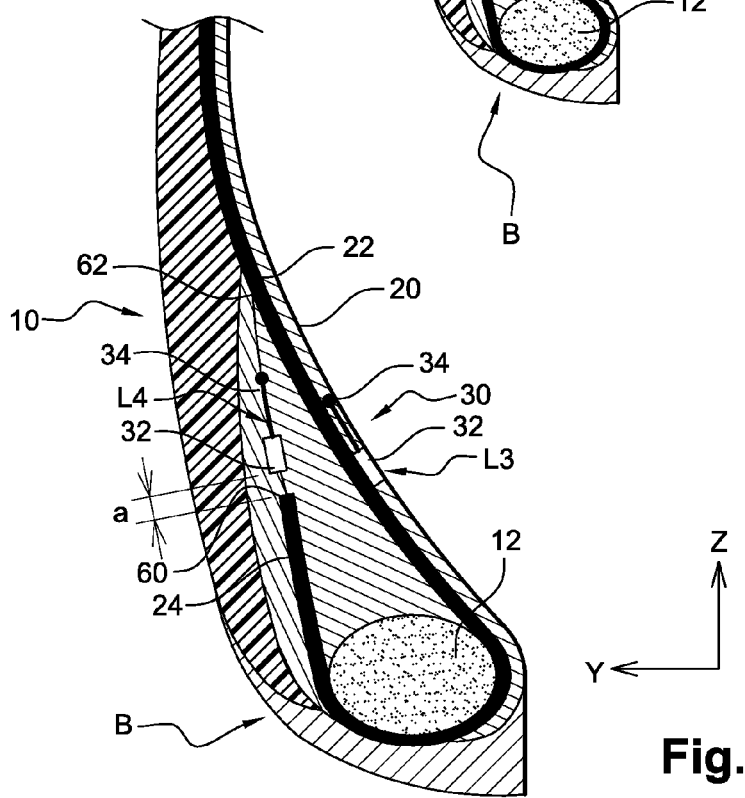
FIG. 8 is a view of an axial section of a bead of the tyre of FIG. 1, illustrating two other possible positionings of the electronic member in the sidewall of the tyre.

FIGS. 1, 7, and 8 show a tyre according to an embodiment of the invention, designated by the general reference 10. In this instance, the tyre 10 is intended to be mounted on a wheel of a motor vehicle of the lorry type.

Conventionally, the tyre 10 comprises a crown S extended by two sidewalls F (only one of which is shown in the figures). The radially internal portion of the sidewall F comprises a bead B and the radially external portion of the sidewall F comprises a shoulder E situated on the border between the sidewall F and the crown S.

A bead wire 12 is embedded in the bead B.

The bead wire 12 is of revolution about a reference axis. This reference axis, substantially parallel to the direction Y, is substantially indistinguishable from an axis of revolution of the tyre.

The crown S comprises a tread 14 furnished with sculptures or protrusions 16 and a reinforcement 18 comprising a plurality of metal plies embedded in masses of rubber.

The tyre 10 also comprises an airtight internal rubber ply 20 and a carcass ply 22. These plies 20 and 22 are of generally toroidal shape and are both coaxial with the bead wire 12. The plies 20 and 22 extend between two annular bead wires 12 of the tyre while passing through the crown S.

In the bead B of the tyre 10, the carcass ply 22 comprises a portion 24 folded around the bead wire 12.

The tyre 10 also comprises a member 30, embedded in one of its sidewalls F, five variant embodiments of which are shown in FIGS. 2 to 6.

The member 30 comprises an electronic device 32, for example an electronic chip. This electronic device 32 is of generally parallelepipedal shape the length of which is of the order of 4 to 10 mm and the width of 2 to 5 mm.

The member 30 also comprises a generally and substantially linear-shaped rectilinear wire antenna 34, the antenna 34 being connected to the electronic device 32. In the variant of FIG. 2, the antenna 34 is made in a single piece, while in the variants of FIGS. 3 to 6 the antenna 34 comprises two distinct branches 36 and 38, each connected to the electronic device 32 and arranged so that their main directions are substantially indistinguishable. Therefore, the antenna 34 of the variants of FIGS. 3 to 6 is made by the assembly of two sub-antennas of the dipole type.

As shown in FIGS. 2 to 6, the antenna 34 extends in a direction that is substantially parallel to the main direction of the electronic device 32.

The member 30 also comprises connection means 40 for electrically connecting the antenna 34 to the device 32. The connection means 40 comprises an electric wire conductor extending in a direction substantially orthogonal to the main direction of the electronic device 32 and consequently substantially orthogonal to the direction of the antenna 34.

In the variants of FIGS. 2 and 3, the connection means 40 comprises two distinct linear conductors of the antenna 34, which conductors are connected to the antenna 34 by spots of weld 42 and to the electronic device 32 by spots of weld 44 situated at the ends of the electronic device 32.

In the variant of FIG. 4, the connection means 40 is an electrical connection that includes a portion of the ends of the branches 36 and 38 of the antenna 34 which have been folded orthogonally to the main direction of the antenna so as to rejoin the electronic device 32.

Figure 5:
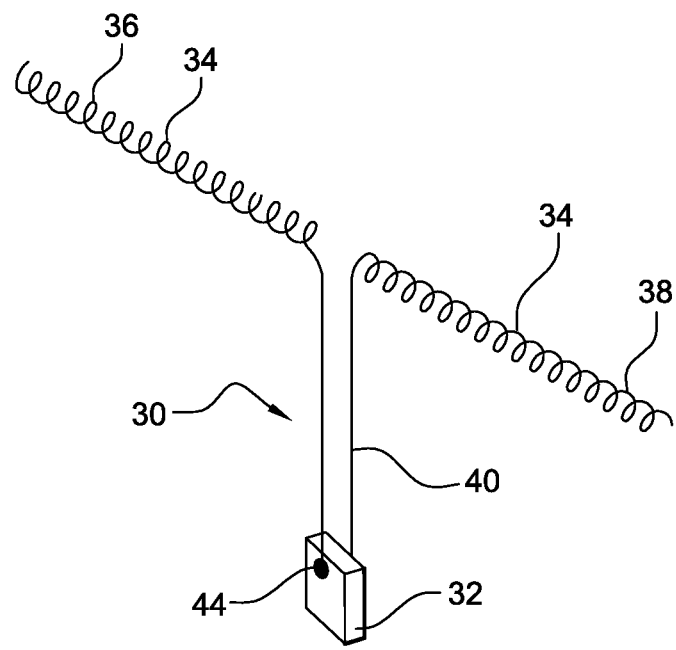
Figure 6:
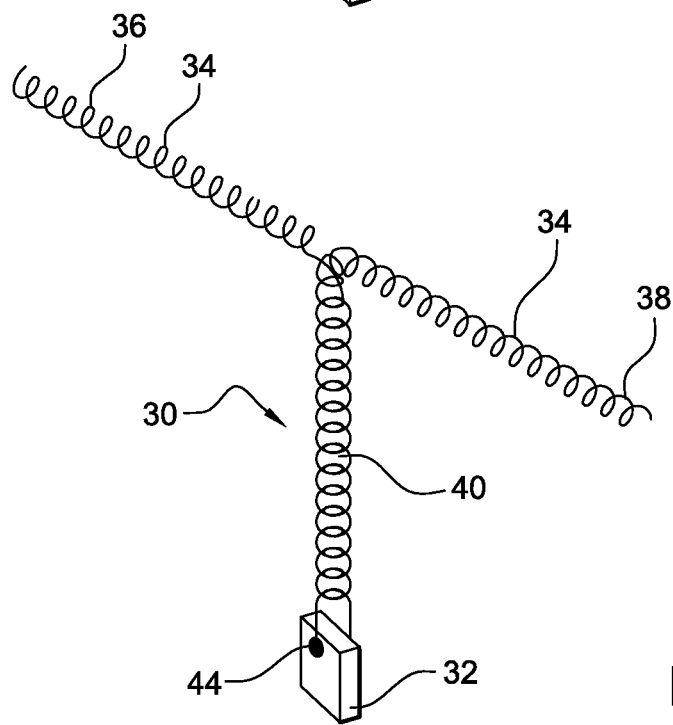

In the variant of FIGS. 5 and 6, the connection means 40 is connected to the electronic device 32 by spots of weld 44 situated in a central zone of the electronic device 32, on two opposite faces of the electronic device 32.

In the variant of FIG. 6, the proximity of the connection means 40 to the two distinct branches 36 and 38 makes it possible to interleave them in one another.

Finally, in the five variants that are shown in FIGS. 2 to 6, the antenna 34 is helical, that is to say that it is wound on itself around its main direction. By virtue of this winding, the antenna is capable of being stretched or compressed in its main direction.

In the five variants, it will be noted that the antenna 34 is situated on only one side of the electronic device 32 even if the antenna comprises two distinct branches.

The length of the device 32 in its main direction is designated by the letter I. The distance between the device 32 and the antenna 34 is designated by the letter d. The distance d is between two and five times the length I.

As shown in FIG. 1, the member 30 is placed in the sidewall F of the tyre 10 in an arrangement such that the antenna 34 is oriented circumferentially with respect to the tyre, that is to say in the direction X, and that it is integrally offset radially on one side of the electronic device 32.

It is advisable to orient the antenna 34 in the sidewall in a circumferential manner. Specifically, when the antenna 34 is oriented radially, it is substantially parallel to the metal wires of the carcass ply 22. In this case, the wires of the carcass ply 22 behave as antennas and absorb a portion of the radiation emitted by the antenna 34. Positioning the antenna 34 circumferentially limits the interference with the carcass ply 22, which improves the electromagnetic transmission.

Various locations of the member 30 in the sidewall F of the tyre can be envisaged. Four positioning examples are shown in FIGS. 7 and 8.

According to a first location $L_1$ shown in FIG. 7, the electronic device 32 is embedded in the airtight internal rubber 20 of the sidewall F of the tyre 10 in the vicinity of the shoulder E and the antenna 34 is offset in a direction radially internal to the tyre 10. As can be seen, in this configuration $L_1$, the electronic device 32 is at the shoulder E of the tyre 10, that is to say in a location in which the rubber is relatively thick and in which the various reinforcing plies are present for preventing too much deformation of this zone. Therefore, the electronic device 32 is relatively protected. The antenna 34, for its part, is in a zone of the sidewall F of the tyre 10 which is not very thick. This zone is particularly well suited to the transmission or reception of electromagnetic waves because not many elements interfere with this transmission.

According to another location $L_2$ shown in FIG. 7, the electronic device 32 is embedded in the sidewall F in the vicinity of the bead B and the antenna 34 is offset radially in a direction radially external to the tyre 10. As can be seen, the member 30 is placed between two layers of rubber of the tyre 10.

According to a third location $L_3$, shown in FIG. 8, the member 30 is placed in a radially internal zone of the sidewall F of the tyre 10, that is to say close to the bead B. Note that, relative to the location $L_2$ shown in FIG. 5, the member 30 is placed on the inside of the tyre 10 relative to the carcass ply 22. In other words, the member 30 is embedded in the airtight internal rubber 20 of the tyre 10.

Finally, according to a fourth example of location $L_4$ shown in FIG. 8, the member 30 is in a plane extending radially while moving away from the reference axis, from a free edge 60 of the folded portion 24 of the carcass ply 22 to a circumferential line 62 of junction between the plane and the carcass ply 22. More precisely, the electronic device 32 of the member 30 is situated at a distance a of between 2 and 3 mm from the free edge 60 of the folded portion 24. In this particular configuration $L_4$, note that the electronic device 32 of the member 30 is particularly well protected since the zone of the sidewall F in which it is embedded is reinforced simultaneously by the portion of the carcass ply 22 situated close to the internal surface of the tyre 10 but also by the folded portion 24 of the carcass ply. The antenna 34 is for its part offset axially in a radially external direction of the sidewall F of the tyre 10 relative to the electronic device 32. In this manner, the antenna 34 is relatively distant from the folded portion 24 of the carcass ply 22 which would be likely to interfere with the transmissions or the reception of electromagnetic waves if the antenna 34 were too close to the end 60 of this portion 24.

Naturally, other locations of the member 30 could be envisaged. Provision may also be made to incorporate a plurality of members in different positions of the sidewall F of the tyre 10.

The invention claimed is:

1. A motor-vehicle tyre, comprising:
    a sidewall;
    a carcass ply that includes metal wires; and
    a member that includes:
        an electronic device,
        a generally linear-shaped rectilinear wire antenna, and
        an electrical connector that connects the wire antenna and the electronic device,
    wherein the member is embedded in the sidewall in an arrangement such that the antenna is oriented circumferentially with respect to the tyre,
    wherein the electrical connector is oriented in a radial direction of the tyre such that the electrical connector is substantially parallel to the metal wires of the carcass ply, and
    wherein the wire antenna is offset radially on one side of the electronic device.

2. The tyre according to the claim 1, wherein the antenna is helical.

3. The tyre according to claim 1 or claim 2, wherein the electrical connector includes at least one helical conductor that produces an inductance.

4. The tyre according to claim 3, wherein the helical conductor has an impedance that is equal to a predetermined value based on the wire antenna and the electronic device.

5. The tyre according to claim 1, wherein the electrical connector is connected to the electronic device at a central zone of the electronic device relative to a circumferential extension thereof.

6. The tyre according to claim 1, wherein
the sidewall includes a bead in a radially internal portion,
the electronic device is embedded in the sidewall in a vicinity of the bead, and
the antenna is offset in a direction radially external to the tyre.

7. The tyre according to claim 6,
wherein the tyre further comprises:
at least one annular bead wire of revolution about a reference axis; and
a carcass ply of generally toroidal shape, the carcass play being coaxial with the bead wire and including a folded portion that is folded around the bead wire,
wherein the member is in a plane extending radially, travelling away from a reference axis, from a free edge of the folded portion of the carcass ply to a circumferential line of junction between the plane and the carcass ply.

8. The tyre according to claim 7, wherein the electronic device is at a distance of between 2 mm and 3 mm from the free edge of the folded portion.

9. The tyre according to claim 1, wherein the member is located at an interface between two masses of rubber of the tyre.

10. The tyre according to claim 1, wherein
the sidewall includes a shoulder in a radially external portion of the tyre,
the electronic device is embedded in the sidewall in a vicinity of the shoulder, and
the antenna is offset in a direction that is radially internal to the tyre.

11. The tyre according to claim 1, wherein the electronic device is an RFID type of device.

12. The tyre according to claim 1, wherein the offset radially of the antenna relative to the electronic device is between two and five times a length of the electronic device in a direction circumferential to the tyre.

13. The tyre according to claim 1,
wherein the tyre further comprises a carcass ply, and
wherein the antenna is situated at least two mm from the carcass ply.

14. The tyre according to the claim 1, wherein the electrical connector extends in a direction that is substantially orthogonal to a main direction of the antenna.

* * * * *